US008180172B2

(12) United States Patent
Kuno (10) Patent No.: US 8,180,172 B2
(45) Date of Patent: May 15, 2012

(54) IMAGE PROCESSING METHOD (75) Inventor: Masashi Kuno, Obu (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 1152 days.

(21) Appl. No.: 11/824,033

(22) Filed: Jun. 29, 2007

(65) Prior Publication Data
US 2008/0002905 A1 Jan. 3, 2008

(30) Foreign Application Priority Data

Jun. 30, 2006 (JP) .................................. 2006-180615

(51) Int. Cl.
G06K 9/40 (2006.01)
G06K 9/38 (2006.01)
G06K 9/00 (2006.01)
(52) U.S. Cl. ........ 382/272; 382/268; 382/162; 382/254; 382/274
(58) Field of Classification Search .................. 382/268, 382/162
See application file for complete search history.

(56) References Cited

U.S. PATENT DOCUMENTS

| 6,351,558 | B1 | 2/2002 | Kuwata |
| 6,885,482 | B1 * | 4/2005 | Kubo et al. .................. 358/518 |
| 6,947,176 | B1 * | 9/2005 | Kubo et al. .................. 358/1.9 |
| 7,023,580 | B2 * | 4/2006 | Zhang et al. ................. 358/1.9 |
| 7,215,365 | B2 * | 5/2007 | Cooper ..................... 348/223.1 |
| 7,359,572 | B2 * | 4/2008 | Liu et al. ..................... 382/274 |
| 7,522,781 | B2 * | 4/2009 | Lee et al. .................... 382/274 |
| 7,885,479 | B2 * | 2/2011 | Kuno .......................... 382/276 |
| 7,912,308 | B2 * | 3/2011 | Kuno .......................... 382/254 |
| 7,920,752 | B2 * | 4/2011 | Kuno .......................... 382/254 |
| 2003/0012448 | A1 | 1/2003 | Kimmel et al. |
| 2005/0052665 | A1 * | 3/2005 | Moroney ....................... 358/1.9 |
| 2005/0104974 | A1 | 5/2005 | Watanabe et al. |
| 2006/0062562 | A1 * | 3/2006 | Utagawa ...................... 396/213 |
| 2009/0096710 | A1 * | 4/2009 | Raman et al. ................. 345/1.1 |

FOREIGN PATENT DOCUMENTS

| JP | H10-198802 | 7/1998 |
| JP | 2001-69525 | 3/2001 |
| JP | 2003-234901 | 8/2003 |

(Continued)

OTHER PUBLICATIONS

Yuki Takematsu et al., Improvement of Image Quality Using Retinex Theory Based on the Statistical Image Evaluation, Journal of the Society of Photographic Science and Technology of Japan, vol. 60, No. 4, pp. 410-416 (2004).

(Continued)

*Primary Examiner* — Bhavesh Mehta
*Assistant Examiner* — Michelle Entezari
(74) *Attorney, Agent, or Firm* — Scully, Scott, Murphy & Presser, P.C.

(57) ABSTRACT

An image processing method corrects an original image. The method performs a retinex processing on a luminance signal of each pixel in an original image. The method determines, for each pixel, a retinex-processed pixel value based on the luminance signal that has been subjected to the retinex processing and at least one signal other than the luminance signal. The method generates a histogram by counting a rate of occurrence of the retinex-processed pixel values for each level over a predetermined first range of pixel values to which the retinex-processed pixel value is possibly assigned. The method reassigns each pixel value based on the histogram.

36 Claims, 8 Drawing Sheets

FOREIGN PATENT DOCUMENTS

| | | |
|---|---|---|
| JP | 2005-004510 | 1/2005 |
| JP | 2005-515515 | 5/2005 |
| JP | 2005-318063 | 11/2005 |
| JP | 2006-92137 | 4/2006 |

OTHER PUBLICATIONS

Japanese Official Action dated Sep. 20, 2011 together with an English language translation from related application JP 2006-180615.

* cited by examiner

IMAGE PROCESSING METHOD

CROSS REFERENCE TO RELATED APPLICATIONS

This application claims priority from Japanese Patent Application No. 2006-180615 filed Jun. 30, 2006. The entire content of this priority application is incorporated herein by reference.

TECHNICAL FIELD

The present invention relates to an image processing method and an image processing device, which can improve the quality of an image subjected to a retinex processing.

BACKGROUND

When a photographic subject is taken against the light, the image of the subject becomes an unclear backlight image with low lightness and low contrast. As a result, details of the image cannot be easily distinguished. Retinex processing is known as one of methods that increase lightness and contrast to improve not only an image taken against the light but also the quality of an overexposed or underexposed image, a blurring image, a noisy image, and an image taken under low-light intensity.

The retinex processing improves image quality of image data of a low-quality region, while maintaining unchanged image data of a high-quality region. In the retinex processing, data on each pixel of an original image is corrected by reflecting data on peripheral pixels by using a Gaussian filter. A reference component data is calculated by a natural logarithm of the corrected pixel data. An illuminance component data is calculated by dividing the pixel data of the original image by a component of the pixel data in the original image. That is, the original image data is divided into two components: the reference component and the illuminance component. After lightness and gradation (contrast) correction such as gamma correction is performed to the illuminance component, the corrected illuminance component is combined with the reference component. Thereby, it is possible to generate data on the image whose low-quality region such as a backlight image region of the original image has been improved in its quality.

When the retinex processing is individually performed for each plane of RGB values, color balance is disrupted or colors are shifted. To solve these problems, U.S. Pat. No. 6,885,482 discloses a method in which RGB values are converted into a coordinate space such as YCbCr or YIQ that is formed of a luminance component and color components. The retinex processing is applied to only the luminance component Y. The luminance component which has been subjected to the retinex processing and the color components which are maintained unchanged are converted back to RGB values. Since only the luminance component is adjusted and the color components are not adjusted, disruption of a color balance and shift in color never occurs. Because the retinex processing is performed only to the luminance component, amount of computation can be reduced and processing can be performed at a higher speed, compared to the case where the retinex processing is individually performed for each plane of RGB values.

SUMMARY

However, by the processing disclosed in U.S. Pat. No. 6,885,482, a dark region in the image is corrected to be slightly lighter and a light region is corrected to be slightly darker. Thus, the dynamic range becomes narrower. Furthermore, since the dark region becomes light or but color saturation remains unchanged, the image disadvantageously becomes whitish and lacks depth.

To solve the above-mentioned problems, an object of the present invention is to provide an image processing method, a storage medium storing a set of image processing program instructions executable on a data processing device, and an image processing device which can improve the quality of an image which has been subjected to a retinex processing.

In order to attain the above and other objects, the invention provides an image processing method. The image processing method corrects an original image. The method includes performing a retinex processing on a luminance signal of each pixel in an original image that is indicative of a luminance component of an original color of each pixel, determining, for each pixel, a retinex-processed pixel value based on the luminance signal that has been subjected to the retinex processing and at least one signal other than the luminance signal that is indicative of a component other than the luminance component of the original color of the each pixel, generating a histogram by counting a rate of occurrence of the retinex-processed pixel values for each level over a predetermined first range of pixel values to which the retinex-processed pixel value is possibly assigned, and reassigning each pixel value based on the histogram.

According to another aspects, the invention provides an image processing device to correct an original image. The image processing device includes a retinex processing unit, a pixel-value determining unit, a histogram generating unit, and a reassigning unit. The retinex processing unit performs a retinex processing on a luminance signal of each pixel that is indicative of a luminance component of an original color of the each pixel in an original image. The pixel-value determining unit determines, for each pixel, a retinex-processed pixel value based on the luminance signal that has been subjected to the retinex processing and at least one signal other than the luminance signal that is indicative of a component other than the luminance component of the original color of the each pixel. The histogram generating unit generates a histogram by counting a rate of occurrence of the retinex-processed pixel values for each level over a predetermined first range of pixel values to which the retinex-processed pixel value is possibly assigned. The reassigning unit reassigns each pixel value based on the histogram.

According to still another aspects, the invention provides a storage medium storing a set of program instructions executable on a data processing device and usable for image processing. Instructions includes performing a retinex processing on a luminance signal of each pixel in an original image that is indicative of a luminance component of an original color of the each pixel, determining, for each pixel, a retinex-processed pixel value based on the luminance signal that has been subjected to the retinex processing and at least one signal other than the luminance signal that is indicative of a component other than the luminance component of the original color of the each pixel, generating a histogram by counting a rate of occurrence of the retinex-processed pixel values for each level over a predetermined first range of pixel values to which the retinex-processed pixel value is possibly assigned, and, reassigning each pixel value based on the histogram.

BRIEF DESCRIPTION OF THE DRAWINGS

Illustrative aspects in accordance with the invention will be described in detail with reference to the following figures wherein.

DETAILED DESCRIPTION

An image processing device according to some aspects of the invention will be described while referring to the accompanying drawings wherein like parts and components are designated by the same reference numerals to avoid duplicating description.

In this embodiment, an image processing program installed in a printer 1 is configured to apply a retinex processing and a histogram processing according to the present embodiment onto image data (original image data) input from a personal computer 2 (hereinafter referred to as PC 2), a digital camera 21 or an external medium 20, thereby compensating for a low-quality image region such as a backlighted area of the image data.

Figure 1:
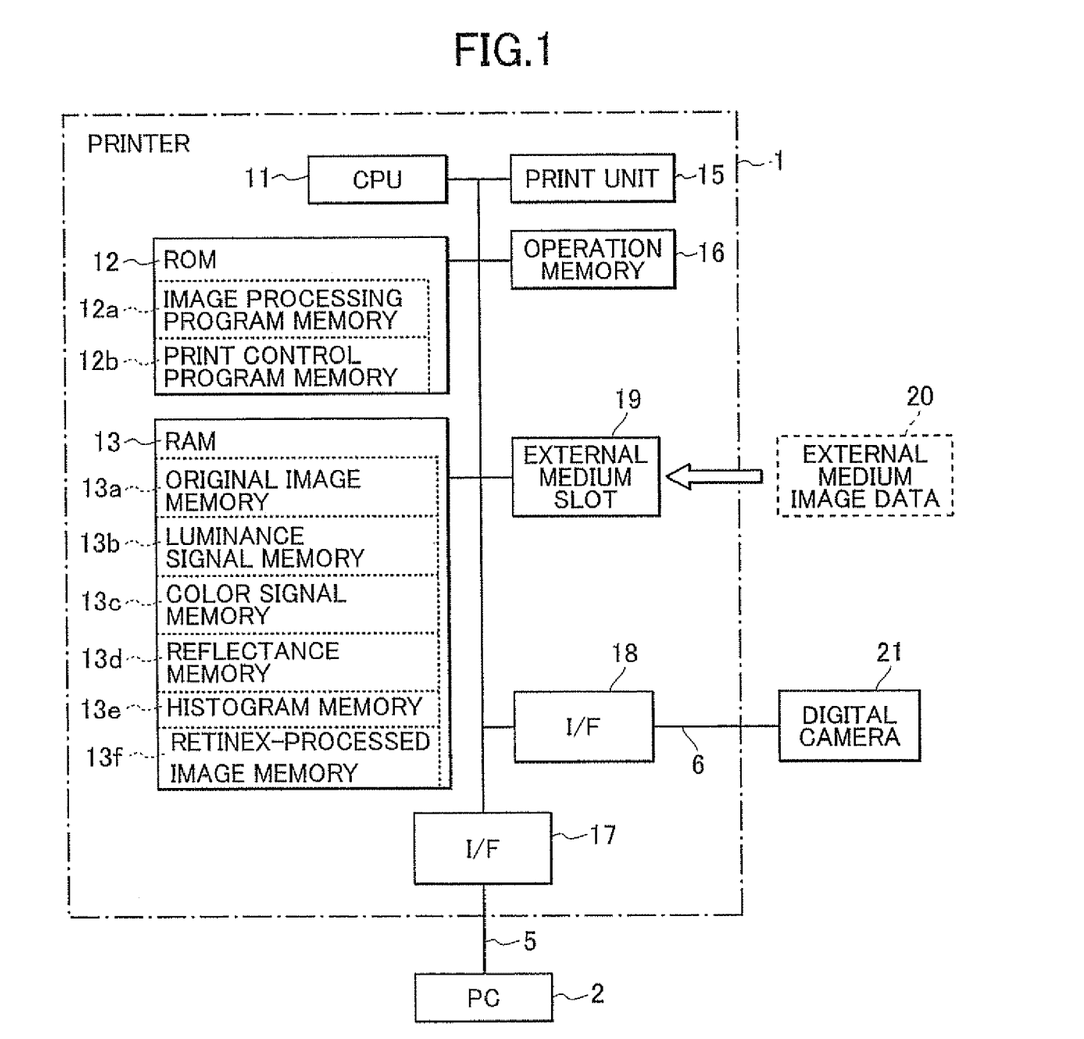
FIG. 1 is a block diagram showing the electric configuration of a printer which installs an image processing program to execute an image processing method according to an embodiment of the present invention.

As shown in FIG. 1, the printer 1 has a CPU 11, a ROM 12, a RAM 13, a print head (not shown), a print unit 15, and an operation panel 16. The printer 15 performs printing (outputting) on a print medium (for example, paper medium). The operation panel 16 has a user operation unit (for example, a ten key pad) which enables the user to input an input value such as an output image size.

The printer 1 further has an interface (I/F) 17, an I/F 18, and an external medium slot 19. The I/F 17 can be connected to the PC 2 through a cable 5. The I/F 18 can be connected to the digital camera 21 through a cable 6. An external medium 20 (formed of a flash memory such as an SD memory card and a memory stick (trademark)) can be freely attached to the external medium slot 19. A USB (Universal Serial Bus) is used as a communication method employed by the I/F 17 and the I/F 18.

The printer 1 can receive image data stored in the PC 2 through the cable 5 and the I/F 17. The printer 1 can receive image data taken by the digital camera 21 through the cable 6 and the I/F 18. Furthermore, image data stored in the external medium 20 can be input into the printer 1 through the external medium slot 19.

The CPU 11 is a processing unit (processor) for controlling the printer 1. The ROM 12 stores various control programs executed by the CPU 11 and fixed values used by the CPU 11 in executing the programs therein. The ROM 12 has an image processing program memory 12a and a print control program memory 12b. The image processing program memory 12a stores a control program for performing image processing including the retinex processing and the histogram processing of the present embodiment. The print control program memory 12b stores a print control program for performing printing of an image.

The RAM (random access memory) 13 is a rewritable memory, and has a working area for storing a group of various registers necessary for the control programs executed by the CPU 11 and a temporary area for temporarily storing data under processing. The RAM 13 includes an original image memory 13a, a luminance signal memory 13b, a color signal memory 13c, a reflectance memory 13d, and a histogram memory 13e, and a retinex-processed image memory 13f.

The original image data memory 13a is for storing the original image data input from the PC 2, the digital camera 21 and the external medium 20 through the I/F 17, the I/F 18 and the external medium slot 19. In this embodiment, both the original image data and output image data are each formed of a set of pixel values (R, G, B) for each of a plurality of pixels. Each pixel value P (=R, G, or B) is an integral value falling within the range from "0" to "255". The set of pixel values (R, G, B) has an R pixel value representing red, a G pixel value representing green, and a B pixel value representing blue.

Red, green and blue are primary colors of light. Various colors are generated by mixing the primary colors of light. Thus, each pixel of the input image is represented in one color including hue and gradation, which is defined by a combination of the R pixel value, the G pixel value and the B pixel value. As the pixel value P (=R, G, or B) is larger, luminance (lightness) is higher.

The luminance signal memory 13b and the color signal memory 13c store respectively a luminance signal Y and color signals Cr and Cb determined based on the RGB pixel values of the original image. A set of values (Y, Cr, Cb) is obtained based on a set of RGB values (R, G, B) according to the following equation 1:

$$\begin{pmatrix} Y \\ C_r \\ C_b \end{pmatrix} = \begin{pmatrix} 0.30 & 0.59 & 0.11 \\ 0.70 & -0.59 & -0.11 \\ -0.30 & -0.59 & 0.89 \end{pmatrix} \begin{pmatrix} R \\ G \\ B \end{pmatrix} \qquad \text{[Equation 1]}$$

The luminance signal Y and the color signals Cr and Cb indicate the luminance component and the color components, respectively, of the color indicated by the pixel values R, G, and B.

If the retinex processing were performed to each of the R value, the G value and the B value, a color balance will be disrupted and operation for the retinex processing takes time. So according to this embodiment, the retinex processing is performed only to the luminance signal Y. Subsequently, the processed luminance signal and the color signals are converted back to RGB values. No disruption of a color balance occurs. Further, processing can be rapidly achieved.

The reflectance memory 13d is for storing reflectance values Refle(x, y) obtained by the retinex processing.

In the histogram processing that is executed after the retinex processing, the CPU 11 determines the occurrence rate of the pixel values P (=R, G, and B) in the retinex-processed image for each integral value from 0 to 255 to create a pixel-value histogram. The histogram memory 13e stores the pixel-value histogram in the pixel-value histogram processing. The CPU 11 determines an upper end range, a lower end range and a median value on the basis of the pixel-value histogram.

In a fourth variation of the histogram processing to be described later, the CPU 11 also uses the histogram memory 13e to count the rate of occurrence of the pixel values P in the original image for each level from 0 to 255 to obtain a pixel-value histogram of the original image, in order to correct the retinex-processed image to bring a median value of the pixel values P in the retinex-processed image, closer to the median value of the pixel value P in the original image.

The retinex-processed image memory 13f is for storing image data obtained by applying the retinex processing on the original image data.

Figure 2:
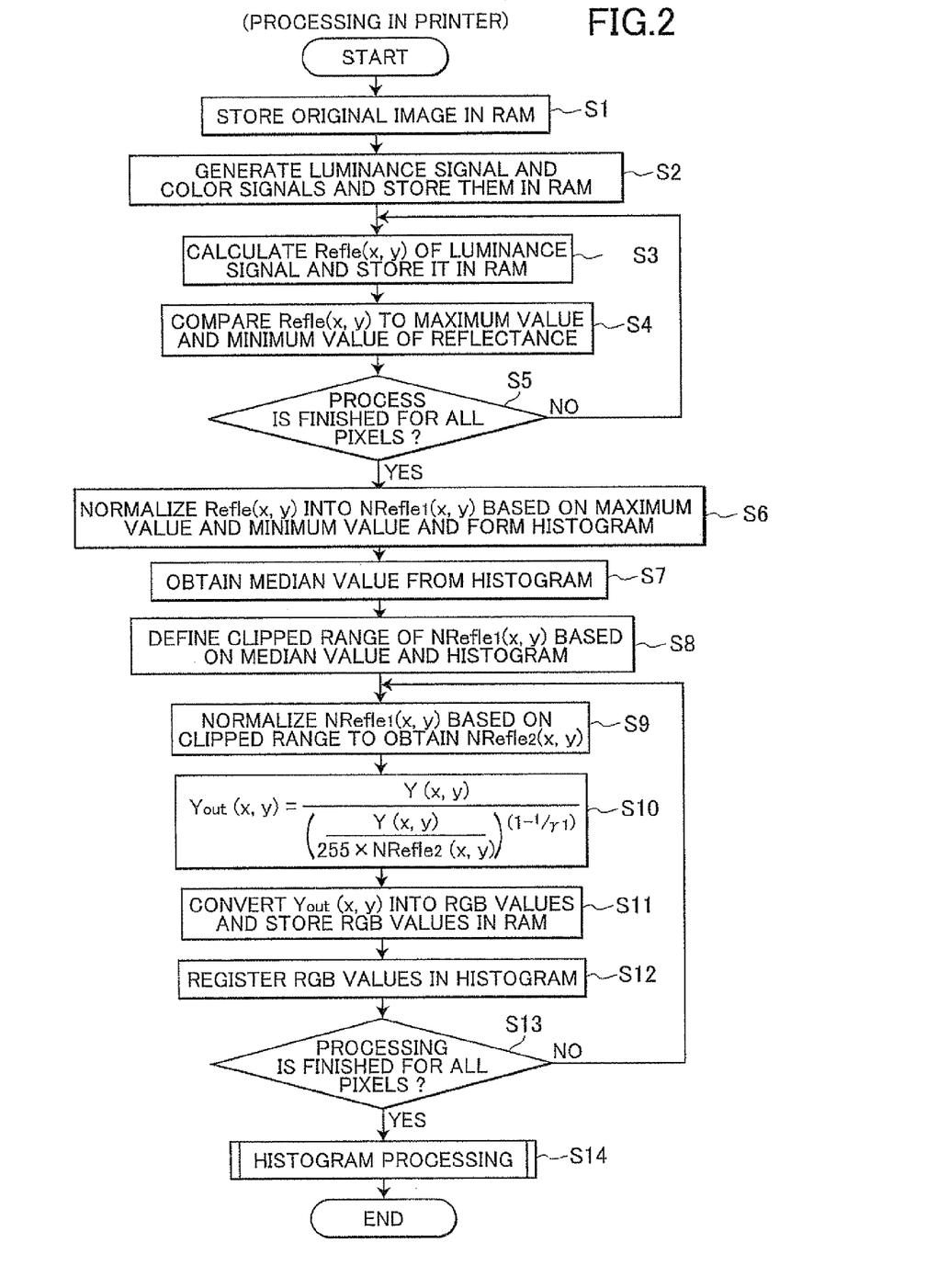
FIG. 2 is a flow chart showing the processing performed by the image processing program.
Figure 3:
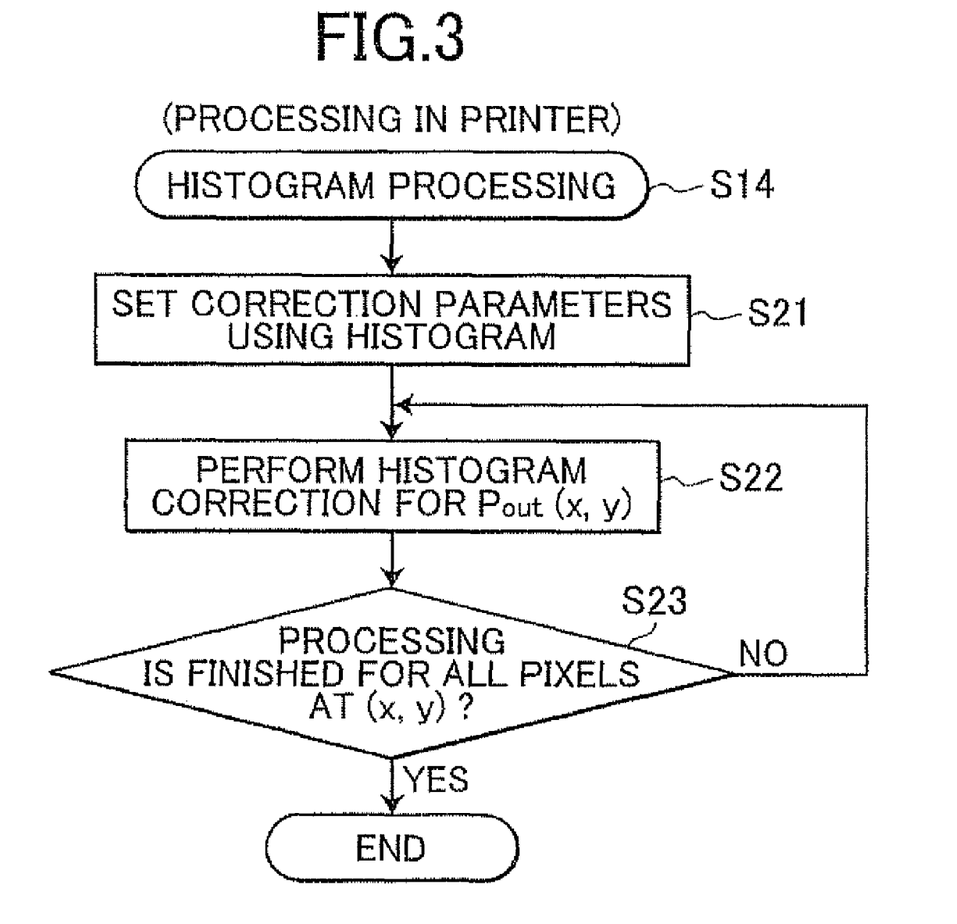
FIG. 3 is a flow chart of a histogram processing in the processing shown in FIG. 2.

Next, image processing performed by the CPU 11 of the printer 1 will be described with reference to FIG. 2 and FIG. 3. FIG. 2 and FIG. 3 are flow charts showing the image processing performed in the printer 1.

As shown in FIG. 2, first, in S1, image data is read from the PC 2 or the like. The CPU 11 stores the read image data in the original image memory 13a. The image data is composed of sets of RGB pixel values (R(x, y), G(x, y), B(x, y)) for a plurality of pixels that are located in the image at pixel locations or coordinates (x, y) defined in the horizontal direction and the vertical direction. When the image data represents a color image, each of the R, G and B pixel values takes 8 bits, for example. That is, each of the R, G, B pixel values takes any integral value from 0 to 255. Each of the RGB pixel values R(x, y), G(x, y), B(x, y) will be referred to also as a pixel value P(x, y).

Next, in S2, the CPU 11 converts a set of RGB pixel values (R(x, y), G(x, y), B(x, y)) of each pixel at (x, y) in the original image into a set of the luminance signal Y(x, y) and the color signals Cr(x, y) and Cb(x, y). This conversion is arithmetically performed according to the equation 1. The CPU 11 stores the luminance signal Y(x, y) and the color signals Cb(x, y) and Cr(x, y) in the luminance signal memory 13b and the color signal memory 13c, respectively.

Next, the CPU 11 performs the retinex processing only to the luminance signal Y(x, y). That is, in S3, the CPU 11 calculates a reflectance Refle(x, y) at one pixel position (x, y). The CPU 11 stores the reflectance Refle(x, y) in the reflectance memory 13d of the RAM 13. The reflectance Refle(x, y) is calculated according to the following equation 2:

$$Refle(x,y)=\log [Y(x,y)/(F(x,y)*Y(x,y))] \quad [\text{Equation 2}]$$

wherein * represents a convolution. That is, $F(x, y)*Y(x, y)=\Sigma_{xi,yi}F(x-x_i, y-y_i)\cdot Y(x_i, y_i)$, wherein $(x_i, y_i)$ represents each of a predetermined number of peripheral pixels that are located adjacent to and surrounding the subject pixel (x, y). F(x, y) represents a Gaussian filter factor at the subject pixel (x, y) as shown in the following equation 3:

$$F(x,y)=\exp(-(x^2+y^2)/(c/75)^2) \quad [\text{Equation 3}]$$

Where c is a coefficient determined dependently on the number of the peripheral pixels. So, the value F(x, y)*Y(x, y) indicates the average value of the luminance values of the peripheral pixels.

Next, in S4, the CPU 11 compares the presently calculated reflectance Refle(x, y) to a maximum value and a minimum value of the reflectance. More specifically, the CPU 11 sets a reflectance Refle(x, y) that is obtained at one pixel position (x, y) in a first calculation as the maximum value and the minimum value. Subsequently, the CPU 11 compares a reflectance Refle(x, y) obtained at the next position (x, y) to the maximum value and the minimum value. If the reflectance Refle(x, y) obtained in this time is larger than the maximum value, the CPU 11 sets the reflectance Refle(x, y) as a new maximum value. If the reflectance Refle(x, y) obtained at this time is smaller than the minimum value, the CPU 11 sets the reflectance Refle(x, y) to a new minimum value. If the reflectance Refle(x, y) obtained at this time is smaller than the maximum value and larger than the minimum value, the maximum value and the minimum value are not changed.

In S5, the CPU 11 determines whether or not the processes in S3 and S4 have been performed for all coordinates (x, y) of the image. If there are unprocessed coordinates (S5: No), the CPU 11 returns to S3. If the processes for all coordinates are completed (S5: Yes), in S6, the CPU 11 normalizes the reflectance Refle(x, y) for all the pixels (x, y) based on the maximum value and the minimum value which are obtained in S4. More specifically, the reflectance Refle(x, y) for each pixel (x, y) is normalized to a first normalized reflectance $NRefle_1(x, y)$ that takes an integer value among 0 to 255 by the following equation 4:

$$NRefle_1(x,y)=[Refle(x,y)-Min(Refle(x,y))]/[Max(Refle(x,y))-Min(Refle(x,y))]\times 255 \quad [\text{Equation 4}]$$

wherein Min(Refle(x,y)) is the minimum value of the reflectance, and Max(Refle(x,y)) is the maximum value of the reflectance.

Also in S6, The CPU 11 generates a histogram by counting the occurrence rate of the first normalized reflectance value $Nrefle_1(x, y)$ for each value among 0 to 255.

Next in S7, the CPU 11 calculates a median value of the first normalized reflectance values $NRefle_1(x,y)$ for all the pixels (x, y). In S8, the CPU 11 determines, in the histogram, an upper clipped range and a lower clipped range which should be clipped from the histogram, and the median of the first normalized reflectance values $NRefle_1(x, y)$. The upper clipped range is determined to range from an upper edge Eu to the maximum value (255) so as to ensure that the number of pixels, whose first normalized reflectance values fall in the range between the median value and the upper edge Eu, is 45% of the total number of the pixels. Similarly, the lower clipped range is determined to range from the minimum value (0) to a down edge Ed so as to ensure that the number of pixels, whose first normalized reflectance values fall in the range between the median value and the down edge Ed, is 45% of the total number of the pixels.

In S9, the first normalized reflectance $NRefle_1(x,y)$ for one pixel (x, y) is normalized to a second normalized reflectance $NRefle_2$ that takes a value among 0.3 to 1.3, as shown in following equations 5 based on the clipped ranges.

$$NRefle_2(x,y)=1.3 (Eu<=NRefle_1(x,y))$$

$$NRefle_2(x,y)=[NRefle_1(x,y)-Ed]/[Eu-Ed]$$
$$(Ed<NRefle_1(x,y)<Eu)$$

$$NRefle_2(x,y)=0.3 (NRefle_1(x,y)<=Eu) \quad [\text{Equations 5}]$$

In S10, the CPU 11 performs the retinex processing on the luminance value Y(x, y) for the subject pixel (x, y) to obtain a retinex-processed value $Y_{out}(x, y)$ by the following equation 6:

$$Y_{out}(x,y)=Y(x,y)/[Y(x,y)/(255 NRefle_2(x,y))]^{(1-1/\gamma 1)} \quad [\text{Equation 6}]$$

It is noted that the parameter γ1 is an arbitrary constant greater than zero (0). In the present embodiment, the parameter γ1 is set to 1.5, for example.

In S11, the CPU 11 obtains a set of retinex-processed RGB pixel values (R(x, y), G(x, y), B(x, y)) by using the retinex-processed luminance signal $Y_{out}(x, y)$ and the color signals Cr(x, y), Cb(x, y) stored in the color signal memory 13c by using the equation 1. The CPU 11 stores the retinex-processed RGB pixel value set ($R_{out}(x, y)$, $G_{out}(x, y)$, $B_{out}(x, y)$) in the retinex processed image memory 13f of the RAM 13.

In S12, the CPU 11 registers the retinex-processed RGB pixel values $R_{out}(x, y)$, $G_{out}(x, y)$, and $B_{out}(x, y)$ in the pixel-value histogram prepared in the histogram memory 13e.

The pixel-value histogram is for indicating the occurrence rate of the pixel values P (=R, G, and B) for each level in the whole range of 0-255. So in S12, the CPU 11 adds 1 to the occurrence rate for the level corresponding to each of the R value, the G value, and the B value of the subject pixel (x, y). For example, when the R, G, B values of the pixel (x, y) are (100, 200, 200), the CPU 11 adds 1 to the occurrence rate corresponding to the value 100, and the CPU 11 adds 2 to the occurrence rate corresponding to the value 200.

In S13, the CPU 11 determines whether or not the process from S9 to S12 has been carried out for all coordinates. If there is unprocessed coordinate (S13: No), the CPU 11 returns to S9. By performing the registration of S12 for all the pixels, the CPU 11 creates the pixel-value histogram by counting up the occurrence rates of the pixel values P (=R, G, and B) for all the pixels. If the processes for all coordinates are completed (S13: Yes), in S14, the CPU 11 performs the histogram processing. When the histogram processing of S14 is completed, the image processing is finished. Image data obtained through the histogram processing of S14 will be used as output image data. For example, the image data will be printed by the print unit 15.

Next, with reference to FIG. 3, the histogram processing at S14 will be described. FIG. 3 is a flow chart showing the histogram processing. In the histogram processing, first in S21, the CPU 11 sets correction parameters based on the pixel-value histogram created in S12. The correction parameters are used in the histogram processing. Various methods for setting the correction parameters will be described later. In S22, the CPU 11 performs a histogram correction to the set of retinex-processed RGB pixel values ($R_{out}(x, y)$, $G_{out}(x, y)$, $B_{out}(x, y)$) for one pixel (x, y) by using the correction parameters set in S21. In S23, the CPU 11 determines whether or not the histogram correction has been carried out for all coordinates (x, y). If there is unprocessed coordinate (S23: No), the CPU 11 returns to S22. If the correction is performed for all coordinates (S23: Yes), the CPU 11 finishes the histogram processing.

Next, the histogram processing of S14 will be described with reference to FIGS. 4A-4D.

Figure 4A:
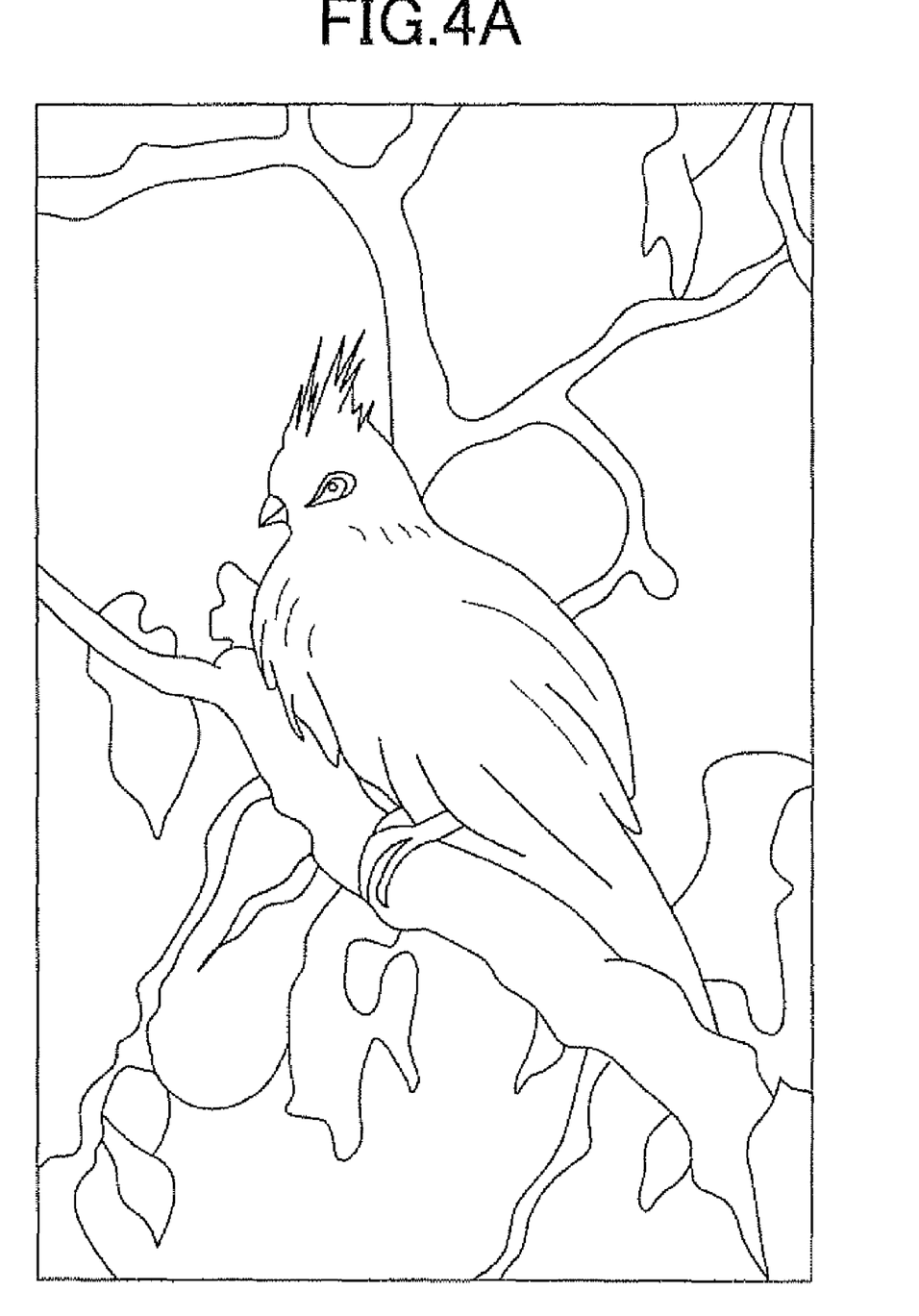
FIG. 4A shows an example of an original image.
Figure 4B:
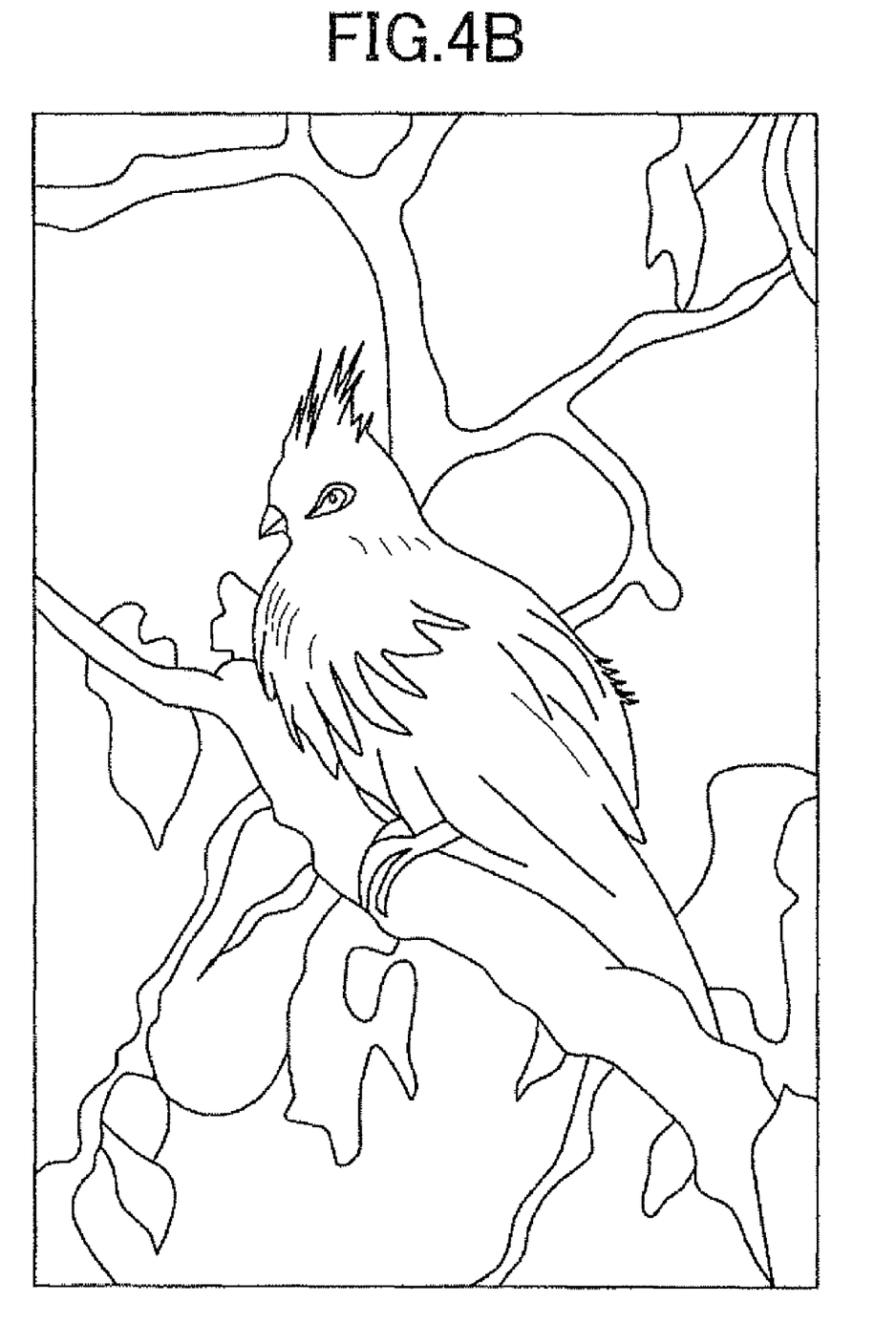
FIG. 4B is a view showing an image obtained by applying a retinex processing to the image of FIG. 4A.
Figure 4C:
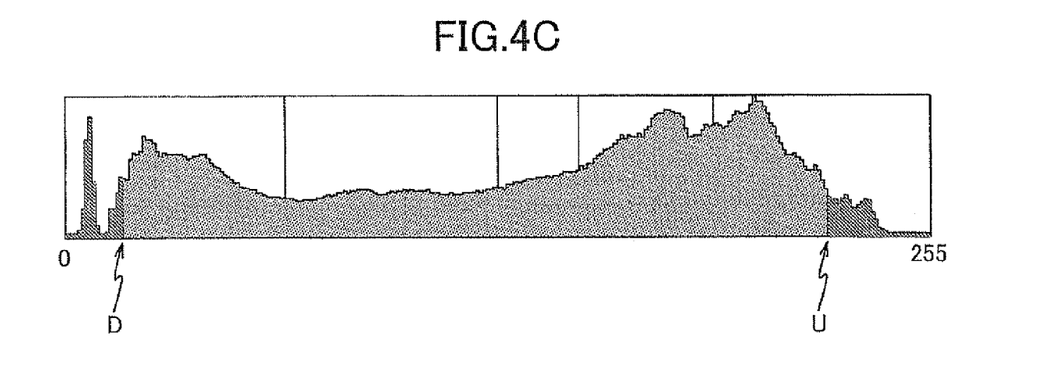
FIG. 4C is a histogram of pixel values obtained based on the image of FIG. 4B.
Figure 4D:
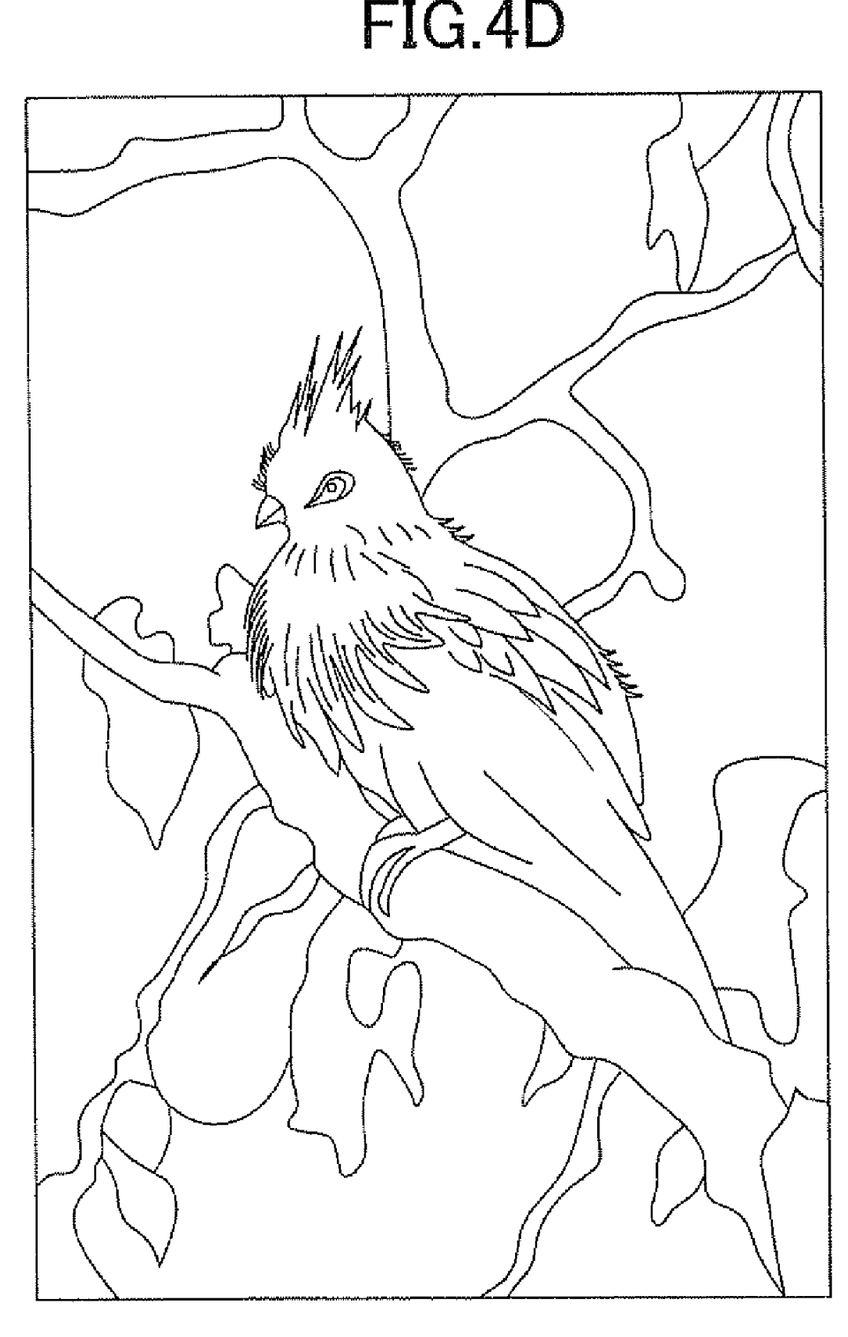
FIG. 4D is a schematic view of an image obtained by applying the retinex processing and the histogram processing to the original image of FIG. 4A.

FIG. 4A is a schematic view of the original image inputted in S1. FIG. 4B shows a schematic view of an image that is obtained when the original image of FIG. 4A is subjected to the retinex processing (yes in S13). FIG. 4C shows the pixel-value histogram obtained through the process of S12 based on the image of FIG. 4B. FIG. 4D is a schematic view of an image obtained when the original image of FIG. 4A is subjected to both the retinex processing and the RGB histogram processing to the original image (yes in S23).

Using the pixel-value histogram created in S12, the CPU 11 sets in S21 cut ratios, by which a light region and a dark region should be removed from the histogram (cut ratios). The CPU 11 determines an upper end value U and a lower end value D based on the cut ratios, as shown in FIG. 4C. For example, when the CPU 11 sets the cut ratio, by which the light region should be removed from the histogram as 3%, the upper end value U is set so that pixel-value entries, whose number is 3% of the total number of pixel-value entries in the histogram, exist in the range from the upper end value U to the maximum value 255. The total number of the pixel-value entries is equal to the three times as large as the total number of the pixels in the image because each pixel has three pixel values, that is, R, G, and B values. Similarly, when the CPU 11 sets the cut ratio by which the dark region is removed as 3%, the lower end value D is set so that pixel-value entries, whose number is 3% of the total number of pixel-value entries, exist in the pixel-value histogram, in the range from the minimum value 0 to the lower end value D.

After setting the upper end value U and the lower end value D in this manner, the CPU 11 corrects in S22 each pixel value $P_{out}(x, y)$ (=$R_{out}(x, y)$, $G_{out}(x, y)$, or $B_{out}(x, y)$) into a corrected pixel value $P_{cor}(x, y)$ (=$R_{cor}(x, y)$, $G_{cor}(x, y)$, $B_{cor}(x, y)$) such that if the value $P_{out}(x, y)$ falls in the range from the minimum value (0) to the lower end value D, the value $P_{out}(x, y)$ is corrected into the value $P_{cor}(x, y)$ that is equal to the minimum value (0), that if the value $P_{out}(x, y)$ falls in the range from the upper end value U to the maximum value (255), the value $P_{out}(x, y)$ is transformed to the value $P_{cor}(x, y)$ that is equal to the maximum value (255), and that if the value $P_{out}(x, y)$ falls in the the range from the lower end value D to the upper end value U, the value $P_{out}(x, y)$ is transformed to the value $P_{cor}(x, y)$ according to a linear or nonlinear function.

More specifically, the CPU 11 corrects the retinex-processed pixel value $P_{out}(x, y)$ into a corrected pixel value $P_{cor}(x, y)$ as follows:

When the retinex-processed pixel value $P_{out}(x, y)$ is equal to or less than the lower end value D, the corrected pixel value $P_{cor}(x, y)$ is equal to 0.

When the retinex-processed pixel value $P_{out}(x, y)$ is equal to or greater than the upper end value U, the corrected pixel value $P_{cor}(x, y)$ is equal to 255.

When the input pixel value $P_{out}(x, y)$ is greater than the lower end value D and less than the upper end value U, the corrected pixel value $P_{cor}(x, y)$ is obtained by the following equation 7:

$$P_{cor}(x,y) = p^{\gamma 2} \times 255 \qquad \text{[Equation 7]}$$

Wherein $p = (P_{out}(x, y) - D)/(U - D)$, and $\gamma 2$ is a constant greater than 0. In the case of $\gamma 2 = 1$, the retinex-processed value $P_{out}(x, y)$ is linearly corrected into the corrected value $P_{cor}(x, y)$ that falls between the minimum value and the maximum value.

In this way, the retinex-processed pixel value set ($R_{out}(x, y)$, $G_{out}(x, y)$, $B_{out}(x, y)$) for each pixel (x, y) is transformed into a corrected pixel value set ($R_{cor}(x, y)$, $G_{cor}(x, y)$, $B_{cor}(x, y)$), which will be used as the output image data.

In the above mentioned process, the CPU 11 selects those pixels whose pixel values fall in a range from the lower end value D to the upper upper end value U. The range (U-D) is within a range from the minimum value (0) to the maximum value (255). The CPU 11 reassigns the pixel value of the selected pixels to fall in the range from the minimum value (0) to the maximum value (255).

In the above-described embodiment, the parameter $\gamma 1$ is set to 1.5 in S10, and the parameter $\gamma 2$ is set to 1 in S21. The values U, and D are determined in S21 such that entries whose number is 3% of the total number of the entries in the histogram are included from the upper end value to the maximum value 255, and entries whose number is 3% of the total number of the entries in the histogram are included from the minimum value 0 to the lower end value D. However, these parameters $\gamma 1$, $\gamma 2$, and the cut ratios (or the upper end value U and the lower end value D) can be modified as shown in following variations (1)-(4):

<Variation (1)>

Figure 5A:
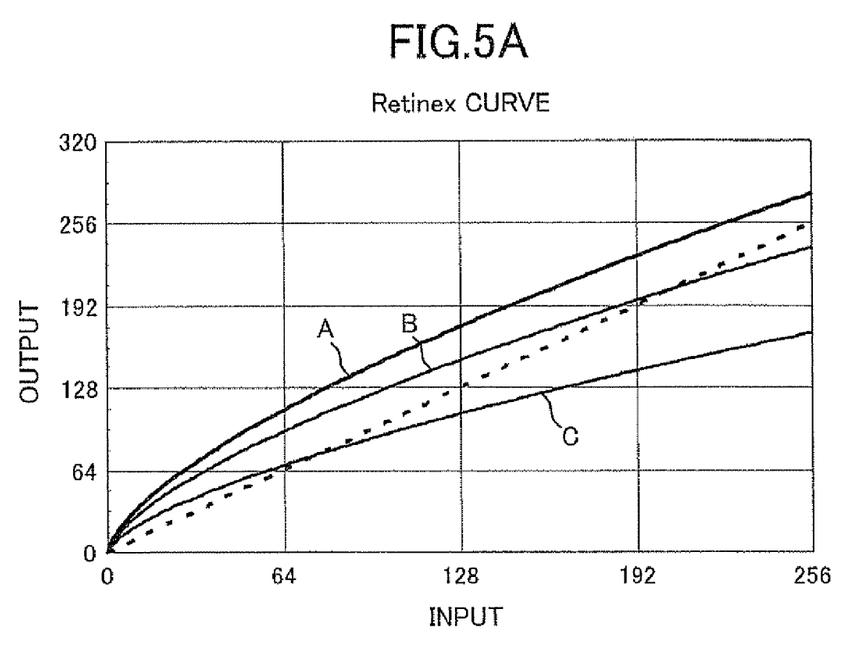
FIG. 5A is a graph showing a relationship between the luminance value of the original image and the luminance value that is obtained by applying the retinex processing to the luminance value of the original image.

FIG. 5A is a graph showing how the luminance value Y is changed into the luminance value $Y_{out}$ by the retinex processing. That is, FIG. 5A shows the input/output relationship of the retinex processing. A horizontal axis represents the input value Y (the luminance value of the original image) and a vertical axis represents the output value $Y_{out}$ (the luminance value changed by the retinex processing). A solid line represented as "A" is a curve when the second normalized reflectance is the maximum value 1.3. A solid line represented as "B" is a curve when the second normalized reflectance is the median value 0.8. A solid line represented as "C" is a curve when the second normalized reflectance is the minimum value 0.3. A broken line shows the case where the input value Y coincides to the output value $Y_{out}$, that is, the case where the luminance value does not change. The lines "A", "B", and "C" are obtained by setting the parameter γ1 as 1.5 in the equation 6 as in the above-described embodiment. As the parameter γ1 is larger, the image is corrected to be lighter. As the parameter γ1 becomes smaller, the image is less corrected. So, accordingly to this variation (1), when the parameter γ1 is set to a value larger than 1.5 in S10, the cut ratio for the dark region is set in S21 greater than 3% to thereby shift the lower end value D to be greater than that in the above-described embodiment. In this way, the bright region of a resultant image can be emphasized by shifting the pixel values to the darker side as a whole through the histogram processing.

Generally, as the value of γ1 used in S10 becomes greater, the cut ratio for the dark region is preferably set greater, thereby increasing the lower end value D.

<Variation (2)>

Figure 5B:
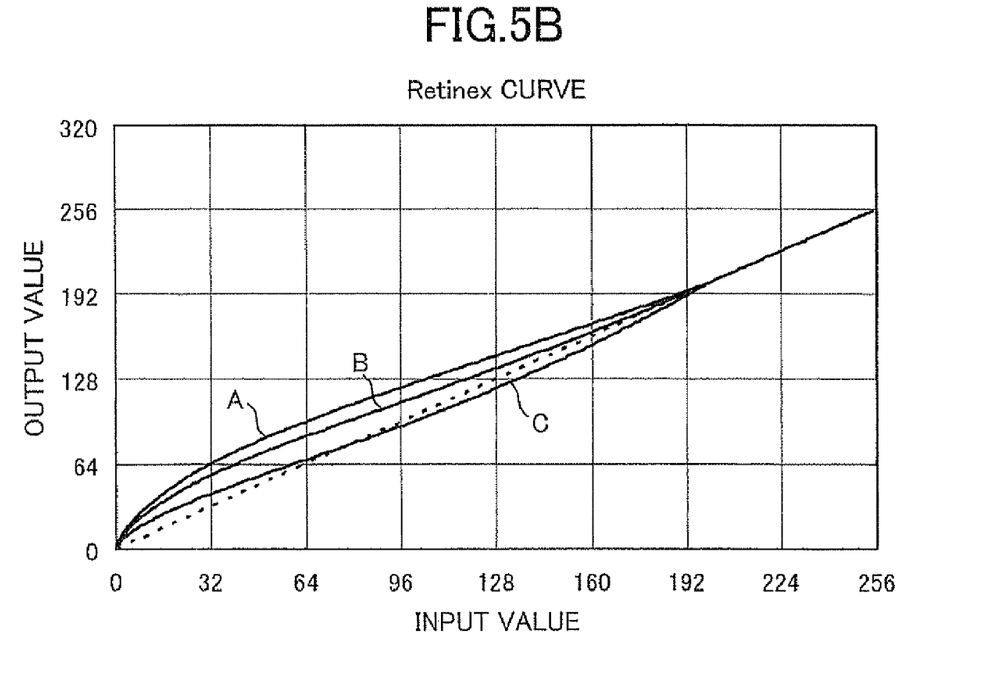
FIG. 5B is a graph showing the relationship between the luminance value of the original image and the luminance value that is obtained by applying the retinex processing to the luminance value of the original image, while not applying the retinex processing to the luminance value falling in a light region.

FIG. 5B is a graph showing the relationship between the input value Y and the retinex-processed output value $Y_{out}$ when the correction of the retinex processing is not performed in the high-lightness region. This method is described in an article entitled "Improvement of Image Quality using Retinex Theory Based on the Statistical Image Evaluation" by Yuki Takematsu, Toshiya Nakaguchi, Norimiti Tsumura and Yoichi Miyake, Journal of The Society of Photographic Science and Technology of Japan, Vol. 60. No 4, pp 410-416 (2004).

That is, in S10, the retinex-processed luminance value $Y_{out}(x, y)$ is further modified into a modified luminance $Y'_{out}(x, y)$ by the following equation 8:

$$Y'_{out}(x,y)=Y(x,y)\times(1-t)+Y_{out}(x,y)\times t \qquad \text{[Equation 8]}$$

wherein, t=0 when Y(x, y)>200, and, t=1.0−$Y_{out}$(x, y)/200 when Y(x, y)<=200. The value $Y'_{out}$(x, y) is substituted for the value $Y_{out}$(x, y). In this way, the correction of equation 6 is not performed in S10 for those pixels, whose luminance values Y are greater than or equal to 200 and therefore which fall in a light region.

According to the embodiment, the retinex processing having the curves shown in FIG. 5A is performed in S10. Accordingly, the light region is raised to be lighter. Thus, in the histogram processing, the CPU 11 sets, in S21, the cut ratio of the light region to as small as 3%. In this variation (2), however the retinex processing having the curves shown in FIG. 5B is executed. So, the CPU 11 sets, in S21, the cut ratio of the light region greater than 3%. As a result, the upper end U is decreased from that in the embodiment. By thus setting the cut ratio for the light region in accordance with the degree how the retinex processing is executed on the light region, the dynamic range can be extended properly and a higher-quality image can be obtained.

Variation (3)

The retinex processing corrects not only the backlight region but also the whole image to be lighter. Thus, the retinex-processed image gives a different impression from the original image. Accordingly to this variation (3), the region which becomes too light is returned to a natural state by executing, in the histogram processing, a gamma correction opposite to the gamma correction that is employed, in the retinex processing. It is noted that the term "gamma correction" is intended to mean a processing to correct the luminance. In the histogram processing, the luminance is corrected as a result of correcting the RGB values.

So, in the variation (3), depending on the value of the parameter γ1 used in S10 for gamma correction in the retinex processing, the parameter γ2 in the histogram processing is set by the following equation 9:

$$\gamma 2=(\gamma 1-1.0)/V+1.0 \qquad \text{[Equation 9]}$$

(where, V is any value from 5 to 20).

The parameter γ1 can be set to 1.5 or another desirable value in S10, and the parameter γ2 is set in S21 based on the parameter γ1.

Accordingly, this variation harmonizes backlight correction and preservation of naturalness.

<Variation (4)>

In this variation, a pixel-value histogram is created for the original image data in S21 as indicative of the occurrence rate of the pixel values P (=R, G, and B) in the original image for each level in the whole range of 0-255. The CPU 11 creates the pixel-value histogram by registering the pixel values P(x, y) (=R(x, y), G (x, y), and B(x, y)) of all the pixels (x, y) in the histogram memory 13e.

A median value OM is determined for the pixel-value histogram for the original image data. A median value RM is determined for the pixel-value histogram for the retinex-processed image data.

In this variation, a parameter γ2 is set in S21 so as to shift the median value RM of the retinex-processed image data toward the median value OM of the original image data through the histogram processing.

That is, the parameter γ2 is determined by the following equation 10:

$$\gamma 2=\log(\text{target}/255)/\log(RM/255) \qquad \text{[Equation 10]}$$

Where target=(OM×α+RM)/(1+α), and α is greater than zero (0).

When the constant α is equal to 1, the parameter "target" falls between the median value OM of the original image and the median value RM of the retinex-processed image. When the constant α is greater than 1, the parameter "target" gets close to the median value OM of the original image. When the constant α is less than 1, the parameter "target" is away from the median value OM of the original image. The constant α may be set to a predetermined value or any value determined by the user.

By the retinex processing, not only a backlighted region but also regions other than the backlighted region are corrected to be lighter. By bringing the median value of the retinex-processed image close to the median value of the original image, the regions other than the backlighted region can be returned to the natural state close to the original state to which no retinex processing is performed yet.

In the original image shown in FIG. 4A, thin lines of feathers around neck and chest of a bird cannot be almost distinguished due to backlight. The feathers can be distinguished in the image after the retinex processing as shown in FIG. 4B. Furthermore, as shown in FIG. 4D, after both the retinex processing and the histogram processing, the image is corrected so that details can be distinguished.

When the parameter γ1 is set to 2.0 in the retinex processing and the parameter γ2 is set to 1.0 in the histogram processing, the details of the feathers appear, but the image becomes whitish as a whole. In this case, the parameter γ2 is changed to 1.2 from 1.0 in the histogram processing. As a result, the image is corrected to be darker in a whole while the details of the feathers are maintained. As a result, the bright region of the resultant image is emphasized.

In the above-mentioned embodiment, the retinex processing is performed on the luminance signal of the RGB color image data and the retinex processed image is converted back to the color RGB image data and then, the RGB color image data is processed to the histogram processing. Thereby, the dynamic range of the image is extended, resulting in a higher-quality image. When the histogram processing is performed, the image quality can be further improved by setting the parameters in the histogram processing according to the parameters in the retinex processing.

The histogram processing solves the problems occurred by the retinex processing that the dynamic range is narrowed, the dark region becomes lighter and the image because whitish and lacks depth, thereby achieving a high-quality image.

While the invention has been described in detail with reference to the above embodiment thereof, it would be apparent to those skilled in the art that various changes and modifications may be made therein without departing from the spirit of the invention.

For example, in the above-mentioned embodiment, the RGB format is used as the color representation system. However, the present invention may be applied to the other color representation systems such as a CMY format.

In the above-mentioned embodiment, the CPU 11 in the printer 1 executes the image processing program for performing the retinex processing and the histogram processing. However, the image processing program may be prepared as an application for the PC 2, and is executed by a CPU (not shown) in the PC 2.

In the above described embodiment, the SSR (Single Scale Retinex) is used in the retinex processing, as indicated by the equation (3). However, MSR (Multi Scale Retinex) may be used in the retinex processing. In MSR, the reflectance $Refle_{MSR}(x, y)$ is used in place of the reflectance $Refle(x, y)$. The reflectance $Refle_{MSR}(x, y)$ is defined by the following equation:

$$Refle_{MSR}(x, y) = \sum_{n=1}^{N} \log \frac{I(x, y)}{F_n(x, y) * I(x, y)}$$

In the case of N=3, $F_n$ is given as following equations.

$$F_1(x, y) = \exp\left(-\frac{(x^2 + y^2)}{(c/25)^2}\right)$$

$$F_2(x, y) = \exp\left(-\frac{(x^2 + y^2)}{(3c/25)^2}\right)$$

$$F_3(x, y) = \exp\left(-\frac{(x^2 + y^2)}{(9c/25)^2}\right)$$

In the image processing in the above-mentioned embodiment, the retinex processing is performed by using the CPU 11. However, the retinex processing may be performed by using a DSP (Digital Signal Processor). The use of DSP enables a high-speed processing. For example, DSP can perform a product sum calculating operation within a short time.

In the above description, each set of RGB values is converted in S2 into a set of the luminance signal Y and, the color signals Cr and Cb. However, each set of RGB values may be converted into a set of the luminance signal Y and color-difference signals I and Q in place of the set of luminance signal Y and the color signals Cr and Cb. The luminance signal Y and the color-difference signals I, Q are obtained based on the RGB values according to the following equation 11.

$$\begin{pmatrix} Y \\ I \\ Q \end{pmatrix} = \begin{pmatrix} 0.30 & 0.59 & 0.11 \\ 0.60 & -0.28 & -0.32 \\ -0.21 & -0.52 & 0.31 \end{pmatrix} \begin{pmatrix} R \\ G \\ B \end{pmatrix} \quad \text{[Equation 11]}$$

The luminance signal signal Y and the color difference signals I and Q indicate the luminance component and the color difference components, respectively, of the color indicated by the pixel values R, G, and B. In this case, in S11, the retinex-processed luminance data Y and the color-difference data I and Q are combined back to the RGB values.

According to the image data in the above-described embodiment, as the pixel value P increases, the image becomes lighter. So, the upper end U is set in the bright region in the histogram, while the lower end D is set in the dark region. However, another type of image data may be used in which as the pixel value P increases, the image becomes darker. For example, when the pixel value P is defined by the CMY system, as the pixel value C, M, or Y increases, the brightness decreases.

In the above description, the pixel value P (=R, G, or B) takes the value in the range of 0-255. However, the pixel value P may take the value in another arbitrary range. Now assume that the arbitrary range has the maximum value MAX, the minimum value MIN, and a width of the range W (=MAX−MIN). In such a case, the values U and D are set in S21 to satisfy an inequality MIN<=D<=U<=MAX.

In S22, when the retinex-processed pixel value $P_{out}$ is equal to or less than the lower end value D, the corrected pixel value $P_{cor}$ is set equal to the value MIN.

When the retinex-processed pixel value $P_{out}$ is equal to or greater than the upper end value U, the corrected pixel value $P_{cor}$ is set equal to the value MAX.

When the retinex-processed pixel value $P_{out}$ is greater than the lower end value D and less than the upper end value U, the corrected pixel value $P_{cor}$ is determined by the following equation 12:

$$P_{cor} = p^{\gamma 2} \times W \quad \text{[Equation 12]}$$

wherein, $p = (P_{out} - D)/(U - D)$.

In variation (4), γ2 is set to satisfy the equation 13;

$$\gamma 2 = \log(\text{target}/\text{MAX})/\log(RM/\text{MAX}). \quad \text{[Equation 13]}$$

In the above-described embodiment, the RGB pixel values for the original image are inputted in S1, and Y, Cr, and Cb are generated in S2 based on the RGB pixel values. However the value Y, Cr, and Cb for all the pixels in the original image may be inputted in S1. In this case, the inputted values Y, Cr, and Cb are stored in the luminance signal memory 13b and the color signal memory 13c. In this case, the process of S2 may be omitted.

What is claimed is:

1. An image processing method for correcting an original image, the method comprising:
   performing a retinex processing on a luminance signal of each pixel in an original image that is indicative of a luminance component of an original color of each pixel, the retinex processing comprising:

calculating a peripheral average luminance for each pixel in the original image;
calculating a reference value that is a logarithm of a first value that is obtained by dividing the luminance signal by the peripheral average luminance;
normalizing the reference value;
setting a parameter γ1 as a constant greater than zero (0);
calculating a second value obtained by dividing the luminance signal by the normalized reference value; and
calculating a corrected luminance signal by dividing the luminance signal by the second value raised to a $(1-1/\gamma 1)$-th power;
determining, for each pixel, a retinex-processed pixel value based on the luminance signal that has been subjected to the retinex processing and at least one signal other than the luminance signal that is indicative of a component other than the luminance component of the original color of the each pixel;
obtaining, for each pixel value, the luminance signal and the at least one other signal based on an original pixel value indicative of the original color of the each pixel;
generating a histogram by counting a rate of occurrence of the retinex-processed pixel values for each level over a predetermined first range of pixel values having a maximum value and a minimum value to which the retinex-processed pixel value is possibly assigned; and
reassigning each pixel value based on the histogram, the reassigning step comprising:
setting a lower end value and an upper end value in the first range;
setting a lower range between the minimum value and the lower end value and an upper range between the upper end value and the maximum value;
setting a second range by removing the upper range and the lower range, from the first range; and
transforming a retinex-processed pixel value that falls in the second range to a pixel value falling in the first range.

2. The image processing method as claimed in claim 1, wherein the at least one other signal includes at least one color signal.

3. The image processing method as claimed in claim 1, wherein the at least one other signal includes at least one color difference signal.

4. The image processing method as claimed in claim 1, further comprising: transforming a retinex-processed pixel value falling in the lower range into a value equal to the minimum value; and transforming a retinex-processed pixel value falling in the upper range into a value equal to the maximum value.

5. The image processing method as claimed in claim 1, wherein the retinex-processing is performed on the luminance signal using a first parameter, and wherein the transforming step uses a second parameter that is dependent on the first parameter.

6. The image processing method as claimed in claim 4, wherein when the retinex processing is performed on a luminance signal that falls in a bright region that is defined brighter than a predetermined luminance value, a width of one of the lower range and the upper range that corresponds to the bright region is set to a value, and when the retinex processing is failed to be performed on the luminance signal falling in the bright region, the width is set lager than the value.

7. The image processing method as claimed in claim 1, wherein one of the upper end value and the lower end value that corresponds to a dark region that is darker than another remaining region in the first range is set based on the parameter γ1.

8. The image processing method as claimed in claim 1, wherein the reassigning step further includes setting a parameter to shift a median value of the retinex-processed pixel values for all the pixels toward a median value of the original pixel values for all the pixels, wherein the transforming the pixel value step uses the parameter.

9. The image processing method as claimed in claim 1, wherein the retinex-processed pixel value $P_{out}$ falling in the second range is transformed into the pixel value $P_{cor}$ falling in the first range by the following formula: $P_{cor}=[(P_{out}-D)/(U-D)]^{\gamma 2} \times W$, wherein U is the upper end value, D is the lower end value, W is a width of the first range, and γ2 is a constant greater than zero (0).

10. The image processing method as claimed in claim 9, wherein the parameter γ2 is given by $\gamma 2=(\gamma 1-1.0)/A+1.0$, and the value A takes a value among 5 to 20.

11. The image processing method as claimed in claim 8, wherein the retinex-processed pixel value $P_{out}$ falling in the second range is transformed into the pixel value $P_{cor}$ falling in the first range by the following formula: $P_{cor}=[(P_{out}-D)/(U-D)]^{\gamma 2} \times W$, wherein U is the upper end value, D is the lower end value, and W is a width of the first range, wherein the parameter γ2 is given by $\gamma 2=\log(\text{target}/\text{MAX})/\log(\text{RM}/\text{MAX})$, wherein MAX is the maximum value, RM is the median of the retinex-processed pixel values for all the pixels, OM is the median value of the original pixel values for all the pixels, and $\text{target}=(OM \times \alpha+RM)/(1+\alpha)$ wherein α is a constant greater than zero (0).

12. The image processing method as claimed in claim 1, further comprising selecting those pixels whose pixel values fall in a second range defined within the first range, reassigning the pixel values of the selected pixels to fall in the first range.

13. An image processing device to correct an original image, the image processing device comprising:
a retinex processing unit that performs a retinex processing on a luminance signal of each pixel that is indicative of a luminance component of an original color of the each pixel in an original image, the retinex-processing unit comprising:
a first calculating unit that calculates a peripheral average luminance for each pixel in the original image;
a second calculating unit that calculates a reference value that is a logarithm of a first value that is obtained by dividing the luminance signal by the peripheral average luminance;
a normalizing unit that normalizes the reference value; a third setting unit that sets a parameter γ1 as a constant greater than zero (0);
a third calculating unit that calculates a second value obtained by dividing the luminance signal by the normalized reference value; and
a fourth calculating unit that calculates a corrected luminance signal by dividing the luminance signal by the second value raised to a $(1-1/\gamma 1)$-th power;
a pixel-value determining unit that determines, for each pixel, a retinex-processed pixel value based on the luminance signal that has been subjected to the retinex processing and at least one signal other than the luminance signal that is indicative of a component other than the luminance component of the original color of the each pixel;
a luminance signal obtaining unit that obtains, for each pixel value, the luminance signal and the at least one other signal based on an original pixel value indicative of the original color of the each pixel;

a histogram generating unit that generates a histogram by counting a rate of occurrence of the retinex-processed pixel values for each level over a predetermined first range of pixel values having a maximum value and a minimum value to which the retinex-processed pixel value is possibly assigned; and a reassigning unit that reassigns each pixel value based on the histogram, the reassigning unit comprising:

a first setting unit that sets a lower end value and an upper end value in the first range, the first setting unit further setting a lower range between the minimum value and the lower end value and an upper range between the upper end value and the maximum value;

a second setting unit that sets a second range by removing the upper range and the lower range, from the first range; and a transforming unit that transforms a retinex-processed pixel value that falls in the second range to a pixel value falling in the first range.

14. The image processing device as claimed in claim 13, wherein the at least one other signal includes at least one color signal.

15. The image processing device as claimed in claim 13, wherein the at least one other signal includes at least one color difference signal.

16. The image processing device as claimed in claim 13, wherein the transforming unit transforms a retinex-processed pixel value falling in the lower range into a value equal to the minimum value, and the transforming unit transforms a retinex-processed pixel value falling in the upper range into a value equal to the maximum value.

17. The image processing device as claimed in claim 13, wherein the retinex-processing unit performs the retinex-processing on the luminance signal using a first parameter, and wherein the transforming unit uses a second parameter that is dependent on the first parameter.

18. The image processing device as claimed in claim 16, wherein when the retinex-processing unit performs the retinex processing on a luminance signal that falls in a bright region that is defined brighter than a predetermined luminance value, the first setting unit set, to a value, a width of one of the lower range and the upper range that corresponds to the bright region, and when the retinex-processing unit fails to perform the retinex processing on the luminance signal falling in the bright region, the first setting unit sets the width to be larger than the value.

19. The image processing device as claimed in claim 13, wherein the first setting unit sets, based on the parameter $\gamma 1$, one of the upper end value and the lower end value that corresponds to a dark region that is darker than another remaining region in the first range.

20. The image processing device as claimed in claim 13, wherein the reassigning unit further includes a parameter setting unit that sets a parameter to shift a median value of the retinex-processed pixel values for all the pixels toward a median value of the original pixel values for all the pixels, wherein the transforming unit uses the parameter.

21. The image processing device as claimed in claim 13, wherein the transforming unit transforms the retinex-processed pixel value $P_{cor}$ falling in the second range into the pixel value $P_{cor}$ falling in the first range by the following formula: $P_{cor}=[(P_{out}-D)/(U-D)]^{\gamma 2} \times W$, wherein U is the upper end value, D is the lower end value, W is a width of the first range, and $\gamma 2$ is a constant greater than zero (0).

22. The image processing device as claimed in claim 21, wherein the parameter $\gamma 2$ is given by $\gamma 2=(\gamma 1-1.0)/A+1.0$, and the value A takes a value among 5 to 20.

23. The image processing device as claimed in claim 20, wherein the transforming unit transforms the retinex-processed pixel value $P_{out}$ falling in the second range into the pixel value $P_{cor}$ falling in the first range by the following formula: $P_{cor}=(P_{out}-D)/(U-D)]^{\gamma 2} \times W$, wherein U is the upper end value, D is the lower end value, and W is a width of the first range, wherein the parameter $\gamma 2$ is given by $\gamma 2=\log(\text{target}/\text{MAX})/\log(\text{RM}/\text{MAX})$, wherein MAX is the maximum value, RM is the median of the retinex-processed pixel values for all the pixels, OM is the median value of the original pixel values for all the pixels, and target=$(OM \times \alpha + RM)/(1+\alpha)$ wherein $\alpha$ is a constant greater than zero (0).

24. The image processing device as claimed in claim 13, further comprising a selecting unit that selects those pixels whose pixel values fall in a second range defined within the first range, wherein the reassigning unit reassigns the pixel values of the selected pixels to fall in the first range.

25. A non-transitory computer-readable medium storing a set of program instructions executable on a data processing device and usable for image processing, instructions comprising:

performing a retinex processing on a luminance signal of each pixel in an original image that is indicative of a luminance component of an original color of the each pixel, the retinex processing comprising:

calculating a peripheral average luminance for each pixel in the original image;

calculating a reference value that is a logarithm of a first value that is obtained by dividing the luminance signal by the peripheral average luminance;

normalizing the reference value;

setting a parameter $\gamma 1$ as a constant greater than zero (0);

calculating a second value obtained by dividing the luminance signal by the normalized reference value; and calculating a corrected luminance signal by dividing the luminance signal by the second value raised to a $(1-1/\gamma 1)$-th power;

determining, for each pixel, a retinex-processed pixel value based on the luminance signal that has been subjected to the retinex processing and at least one signal other than the luminance signal that is indicative of a component other than the luminance component of the original color of the each pixel;

obtaining, for each pixel value, the luminance signal and the at least one other signal based on an original pixel value indicative of the original color of the each pixel;

generating a histogram by counting a rate of occurrence of the retinex-processed pixel values for each level over a predetermined first range of pixel values having a maximum value and a minimum value to which the retinex-processed pixel value is possibly assigned; and reassigning each pixel value based on the histogram, the reassigning step comprising:

setting a lower end value and an upper end value in the first range;

setting a lower range between the minimum value and the lower end value and an upper range between the upper end value and the maximum value;

setting a second range by removing the upper range and the lower range, from the first range; and transforming a retinex-processed pixel value that falls in the second range to a pixel value falling in the first range.

26. The non-transitory computer-readable medium as claimed in claim 25, wherein the at least one other signal includes at least one color signal.

27. The non-transitory computer-readable medium as claimed in claim 25, wherein the at least one other signal includes at least one color difference signal.

28. The non-transitory computer-readable medium as claimed in claim 25, instructions further comprising: transforming a retinex-processed pixel value falling in the lower range into a value equal to the minimum value; and transforming a retinex-processed pixel value falling in the upper range into a value equal to the maximum value.

29. The non-transitory computer-readable medium as claimed in claim 25, wherein the retinex-processing is performed on the luminance signal using a first parameter, and wherein the transforming step uses a second parameter that is dependent on the first parameter.

30. The non-transitory computer-readable medium as claimed in claim 28, wherein when the retinex processing is performed on a luminance signal that falls in a bright region that is defined brighter than a predetermined luminance value, a width of one of the lower range and the upper range that corresponds to the bright region is set to a value, and when the retinex processing is failed to be performed on the luminance signal falling in the bright region, the width is set lager than the value.

31. The non-transitory computer-readable medium as claimed in claim 25, wherein one of the upper end value and the lower end value that corresponds to a dark region that is darker than another remaining region in the first range is set based on the parameter $\gamma 1$.

32. The non-transitory computer-readable medium as claimed in claim 25, wherein the reassigning step further includes setting a parameter to shift a median value of the retinex-processed pixel values for all the pixels toward a median value of the original pixel values for all the pixels, wherein the transforming the pixel value step uses the parameter.

33. The non-transitory computer-readable medium as claimed in claim 25, wherein the retinex-processed pixel value $P_{out}$ falling in the second range is transformed into the pixel value $P_{cor}$ falling in the first range by the following formula: $P_{cor}=[(P_{out}-D)/(U-D)]^{\gamma 2} \times W$, wherein U is the upper end value, D is the lower end value, W is a width of the first range, and $\gamma 2$ is a constant greater than zero (0).

34. The non-transitory computer-readable medium as claimed in claim 33, wherein the parameter $\gamma 2$ is given by $\gamma 2=(\gamma 1-1.0)/A+1.0$, and the value A takes a value among 5 to 20.

35. The non-transitory computer-readable medium as claimed in claim 32, wherein the retinex-processed pixel value $P_{out}$ falling in the second range is transformed into the pixel value $P_{cor}$ falling in the first range by the following formula: $P_{cor}=[(P_{out}-D)/(U-D)]^{\gamma 2} \times W$, wherein U is the upper end value, D is the lower end value, and W is a width of the first range, wherein the parameter $\gamma 2$ is given by $\gamma 2=\log(\text{target}/\text{MAX})/\log(RM/MAX)$, wherein MAX is the maximum value, RM is the median of the retinex-processed pixel values for all the pixels, OM is the median value of the original pixel values for all the pixels, and $\text{target}=(OM \times \alpha + RM)/(1+\alpha)$ wherein $\alpha$ is a constant greater than zero (0).

36. The non-transitory computer-readable medium as claimed in claim 25, further comprising selecting those pixels whose pixel values fall in a second range within the first range, reassigning the pixel value of the selected pixels to fall in the first range.

* * * * *